(12) United States Patent
Kim

(10) Patent No.: US 11,972,127 B2
(45) Date of Patent: Apr. 30, 2024

(54) MEMORY SYSTEM EXECUTING BACKGROUND OPERATION USING EXTERNAL DEVICE AND OPERATION METHOD THEREOF

(71) Applicant: SK hynix Inc., Icheon-si (KR)

(72) Inventor: Jung Woo Kim, Icheon-si (KR)

(73) Assignee: SK HYNIX INC., Icheon-si (KR)

(*) Notice: Subject to any disclaimer, the term of this patent is extended or adjusted under 35 U.S.C. 154(b) by 0 days.

(21) Appl. No.: 17/701,189

(22) Filed: Mar. 22, 2022

(65) Prior Publication Data
US 2023/0152996 A1 May 18, 2023

(30) Foreign Application Priority Data
Nov. 17, 2021 (KR) .................. 10-2021-0158690

(51) Int. Cl.
*G06F 3/06* (2006.01)
*G06F 12/0846* (2016.01)
*G06F 12/0882* (2016.01)

(52) U.S. Cl.
CPC ............ *G06F 3/064* (2013.01); *G06F 3/0619* (2013.01); *G06F 3/0634* (2013.01); *G06F 3/0659* (2013.01); *G06F 3/0679* (2013.01); *G06F 12/0851* (2013.01); *G06F 12/0882* (2013.01)

(58) Field of Classification Search
CPC ...... G06F 3/064; G06F 3/0619; G06F 3/0659; G06F 3/0679; G06F 3/0634; G06F 12/0851; G06F 12/0882

USPC ......................................................... 711/154
See application file for complete search history.

(56) References Cited

U.S. PATENT DOCUMENTS

| | | | |
|---|---|---|---|
| 2020/0014688 A1* | 1/2020 | Kohli | H04L 9/0891 |
| 2020/0042438 A1* | 2/2020 | Yi | G06F 12/0246 |
| 2021/0133111 A1* | 5/2021 | Lee | G06F 12/0851 |
| 2023/0069159 A1* | 3/2023 | Huang | G06F 3/0649 |

FOREIGN PATENT DOCUMENTS

| | | |
|---|---|---|
| KR | 20160001944 A | 1/2016 |
| KR | 20210003625 A | 1/2021 |

* cited by examiner

*Primary Examiner* — Hua J Song
(74) *Attorney, Agent, or Firm* — Perkins Coie LLP

(57) ABSTRACT

Embodiments of the present disclosure relate to a memory system and operation method thereof. According to embodiments of the present disclosure, the memory system may include i) a memory device including a plurality of memory blocks, wherein each of the plurality of memory blocks include a plurality of pages; and ii) a memory controller configured to determine a first super memory block among a plurality of super memory blocks, wherein each of the plurality of super memory blocks includes one or more of the plurality of memory blocks, set a lock to prevent a background operation from being executed for the first super memory block, and transmit data stored in the first super memory block to an external device.

16 Claims, 14 Drawing Sheets

FIG.6

| SBLK | VP(%) | EC |
|---|---|---|
| SBLK(index:1) | 50 | 10 |
| SBLK(index:2) | 30 | 5 |
| SBLK(index:3) | 60 | 10 |
| ⋮ | ⋮ | ⋮ |
| SBLK(index:N-2) | 50 | 15 |
| SBLK(index:N-1) | 45 | 20 |
| SBLK(index:N) | 40 | 10 |

THR_VP : 45    THR_EC : 10

⇨ determine first super memory block from SBLK(index:1), SBLK(index:3)

MEMORY SYSTEM EXECUTING BACKGROUND OPERATION USING EXTERNAL DEVICE AND OPERATION METHOD THEREOF

CROSS-REFERENCES TO RELATED APPLICATION

This patent document claims the priority and benefits of Korean patent application number 10-2021-0158690 filed on Nov. 17, 2021, which are incorporated herein by reference in its entirety.

TECHNICAL FIELD

Various embodiments of the disclosed technology generally relate to a memory system and operation method thereof.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

The memory system may execute a background operation in order to prevent an error in data stored in the memory device and to secure a free space for storing data in the memory device. When the background operation is executed, data stored in a specific area of the memory device may be migrated to another area of the memory device.

SUMMARY

Various embodiments of the disclosed technology are directed to a memory system and operating method thereof, which is capable of migrating data stored in a specific area of a memory device to another area of the memory device efficiently.

In one aspect, a memory system is provided to include i) a memory device including a plurality of memory blocks, wherein each of the plurality of memory blocks include a plurality of pages; and ii) a memory controller in communication with the memory device and configured to determine a first super memory block among a plurality of super memory blocks, wherein each of the plurality of super memory blocks includes one or more of the plurality of memory blocks, set a lock to prevent a background operation from being executed for the first super memory block, and transmit data stored in the first super memory block to an external device.

In another aspect, a method for operating a memory system is provided. The method includes determining a first super memory block among a plurality of super memory blocks, wherein each of the plurality of super memory blocks includes one or more of a plurality of memory blocks including a plurality of pages, setting a lock to prevent a background operation from being executed for the first super memory block, and transmitting data stored in the first super memory block to an external device.

In another aspect, a memory controller is provided to include i) an external interface for communicating with an external storage device including a plurality of memory blocks, wherein each of the plurality of memory blocks include a plurality of pages; and ii) a control circuit in communication with the external interface and configured to determine a first super memory block among a plurality of super memory blocks, wherein each of the plurality of super memory blocks includes one or more of the plurality of memory blocks, set a lock to prevent a background operation from being executed for the first super memory block, and transmit data stored in the first super memory block to an external device.

According to embodiments of the disclosed technologies, it is possible to migrate data stored in a specific area of a memory device to another area of the memory device efficiently.

BRIEF DESCRIPTION OF THE DRAWINGS

FIG. 6 is a diagram illustrating the memory system determining a first super memory block based on an embodiment of the disclosed technology.

DETAIL DESCRIPTION OF THE EXEMPLARY EMBODIMENTS

Figure 1:
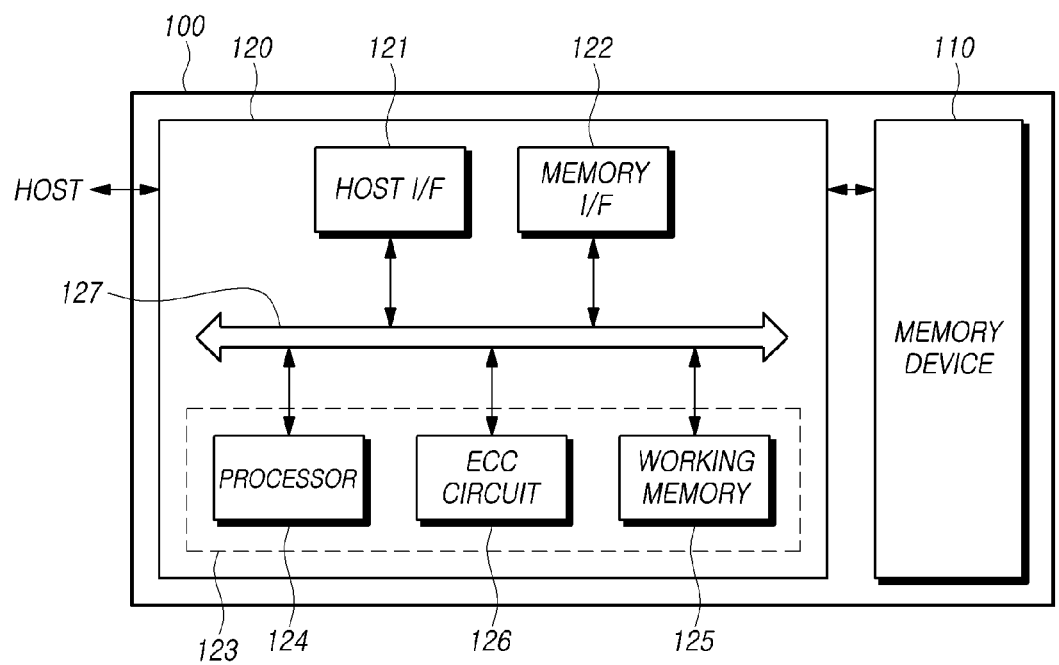
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the disclosed technology are described below in more detail with reference to the accompanying drawings. We note that the disclosed technology may be embodied in different forms and variations, and should not be construed as being limited to the embodiments set forth herein. Throughout the disclosure, like reference numerals refer to like parts throughout the various figures and embodiments of the disclosed technology.

The methods, processes, and/or operations described herein may be performed by code or instructions to be executed by a computer, processor, controller, or other signal processing device. The computer, processor, controller, or other signal processing device may be those described herein or one in addition to the elements described herein. The disclosed algorithms are implementations of the methods (or operations of the computer, processor, controller, or other signal processing device) that are described, the code or instructions for implementing algorithms may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. Some examples of the background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host, e.g., via receiving a command or request from the host. Alternatively, the memory controller 120 may control the operation of the memory device 110 in absence of a request or commend from the host including, e.g., performing certain background operations of the memory device without receiving and executing a command from a host.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
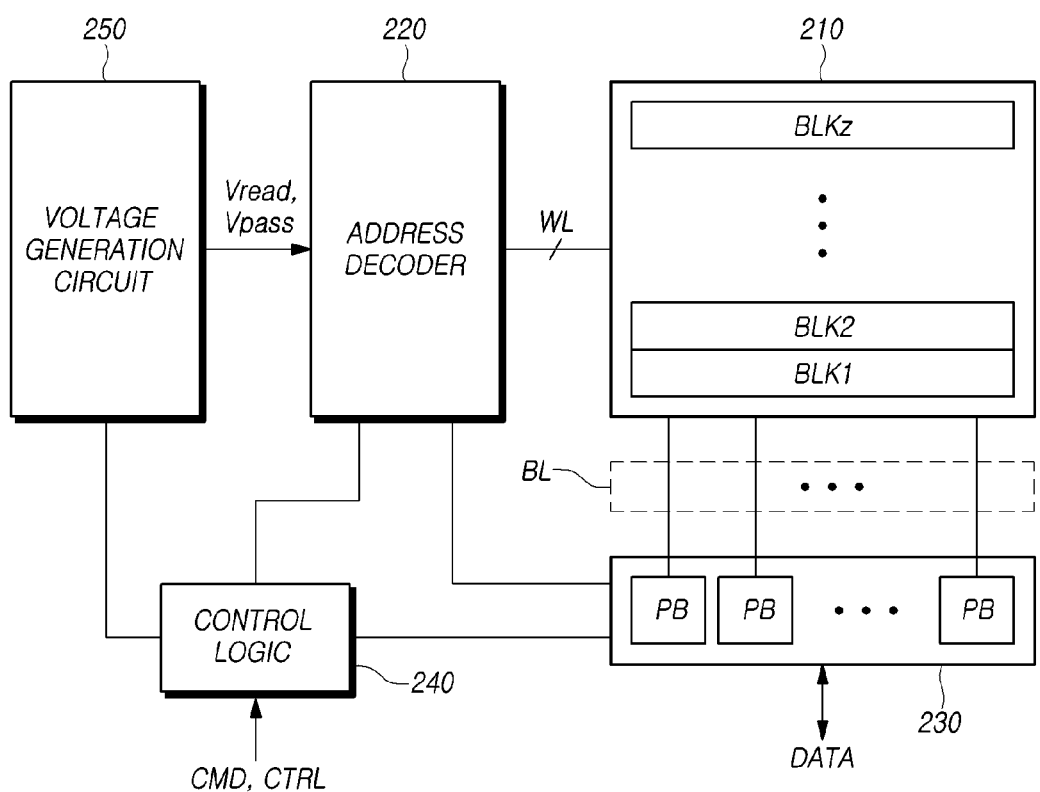
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
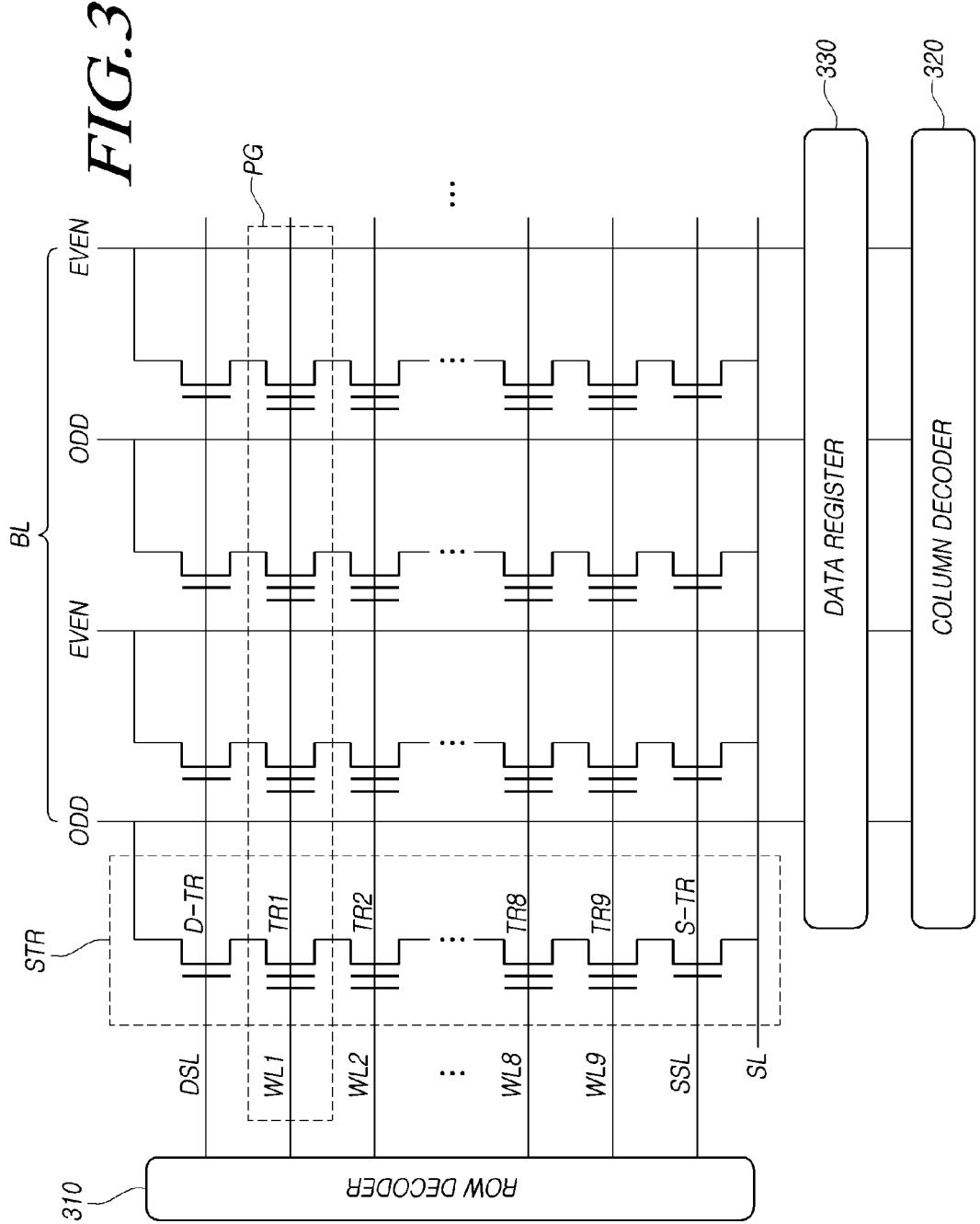
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
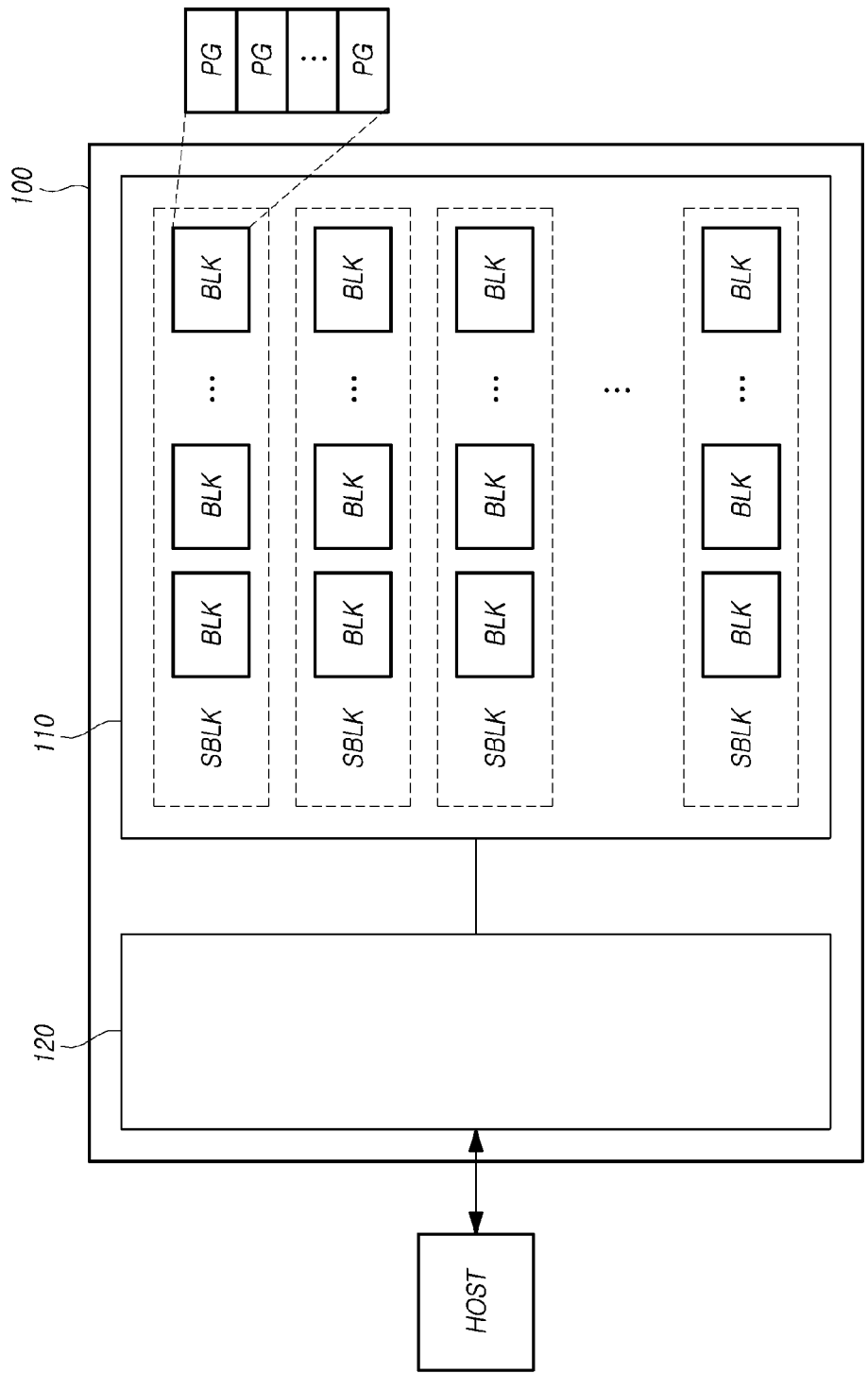
FIG. 4 is a diagram illustrating a schematic structure of a memory system based on an embodiment of the disclosed technology.

FIG. 4 is a diagram illustrating a schematic structure of a memory system based on an embodiment of the disclosed technology.

Referring to FIG. 4, the memory system 100 may include a memory device 110 and a memory controller 120.

The memory device 110 may include a plurality of memory blocks BLK. Each of the plurality of memory blocks BLK may include a plurality of pages PG respectively.

And the memory device 110 may include a plurality of super memory blocks SBLK.

The super memory block SBLK is a logical unit in which one or more memory blocks BLK are grouped for the memory system 100 to perform a specific operation (e.g. a read operation, a write operation, an erase operation). Each of the plurality of super memory blocks SBLK may include one or more of the plurality of memory blocks BLK respectively.

The memory blocks included in one super memory block may operate simultaneously. That is, with respect to the memory blocks included in one super memory block, the memory device 110 may execute a specific operation (e.g. a read operation, a write operation, an erase operation) in parallel.

The memory controller 120 may communicate with an external storage device including a plurality of memory blocks each including a plurality of pages respectively, through an external interface. In this case, the external storage device may be, for example, the memory device 110. And the external interface may be, for example, the memory interface 122. Hereinafter, a case in which the external storage device is the memory device 110 will be described as an example.

The memory controller 120 may control the memory device 110 to process a command received from the external device EXT_DEV. For example, if a read command is received from the external device EXT_DEV, the memory controller 120 may read data from the memory device 110 to process the read command. For another example, if a write command is received from the external device EXT_DEV, the memory controller 120 may write data to the memory device 100 to process the write command.

The external device EXT_DEV may be, for example, the host HOST described in FIG. 1. In some implementations, the external device EXT_DEV may be a computing device (e.g. a server, a desktop, a laptop, an embedded system) without being limited to the host HOST.

Hereinafter, an operation of the memory system 100 described in FIG. 4 will be described in more detail.

Figure 5:
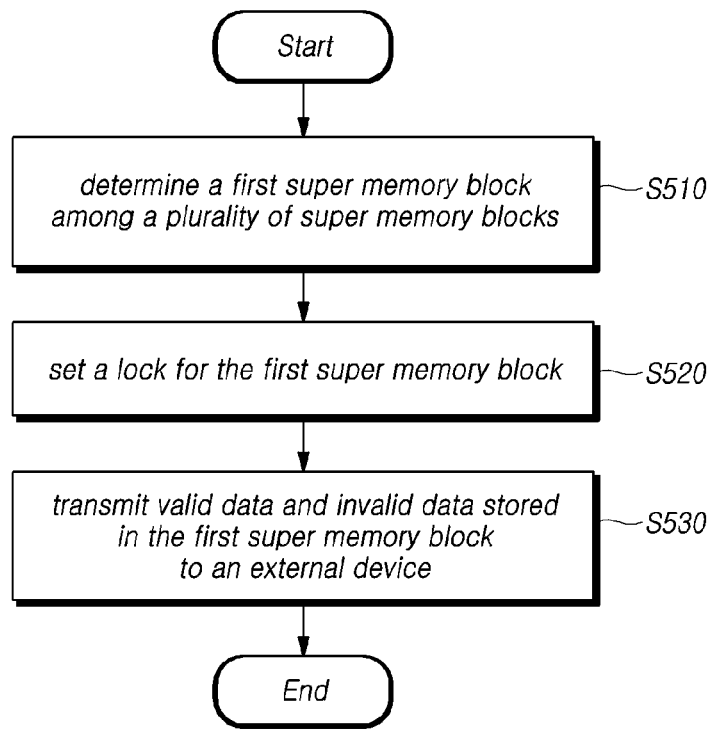
FIG. 5 is a flow chart illustrating a schematic operation of the memory system based on an embodiment of the disclosed technology.

FIG. 5 is a flow chart illustrating a schematic operation of the memory system based on an embodiment of the disclosed technology.

Referring to FIG. 5, the memory controller 120 of the memory system 100 may determine a first super memory block among the plurality of super memory blocks SBLK described in FIG. 4 (S510).

And the memory controller 120 may set a lock to prevent background operations (e.g. garbage collection, wear leveling, read reclaim) from being executed for the first super memory block determined in operation S510 (S520).

The lock may be implemented in various ways. For example, the lock may be implemented as a signal output to the memory device 110 or a flag stored in the memory device 110. For another example, the lock may be implemented as a flag or a type included in a super memory block table that stores information on the plurality of super memory blocks SBLK. In this case, the super memory block table may be stored in the working memory 125 and managed by the memory controller 120.

By setting a lock on the first super memory block, the memory controller 120 may exclude the first super memory block from the target of the background operation when executing the background operation. Accordingly, even if the first super memory block satisfies the condition for being the target of the background operation, the background operation for the first super memory block is not executed until the lock is released.

The memory controller 120 may transmit valid data and invalid data stored in the first super memory block to the external device EXT_DEV (S530). Valid data may be referenced by a command from the host HOST, and invalid data may not be referenced by a command from the host HOST. If the original valid data is updated, the original data becomes invalid data after the update.

The memory controller 120 transmits the data stored in the first super memory block to the external device EXT_DEV regardless of the validity of the data to obtain, by using the external device EXT_DEV, the same effect as the background operation is executed on the data stored in the first super memory block more quickly.

If the memory controller 120 executes a background operation on the first super memory block directly, the speed at which the memory controller 120 executes the background operation on the first super memory block may be limited due to the limitation of the performance of the memory controller 120. Also, since the background operation on the first super memory block is executed, there may be some delay caused in processing of a read operation or a write operation on another super memory block included in the memory device 110.

When the memory controller 120 processes a background operation for the first super memory block using the external device EXT_DEV, it is possible for the memory controller 120 to overcome the performance limitation. This is because, in general, the operation speed of the external device EXT_DEV is faster than the operation speed of the memory controller 120. In addition, since the memory controller 120 does not directly execute a background operation on the first super memory block, there is no delay caused in processing a read operation or a write operation for another super memory block included in the memory device 110. In addition, since the processing of the background operation for the first super memory block may be executed at a desired time point by the external device EXT_DEV, it is possible for the external device EXT_DEV to manage resource for the memory controller 120 or the memory device 110 directly.

As such, when the external device EXT_DEV processes the background operation for the first super memory block, the external device EXT_DEV may determine which part of the data stored in the first super memory block is valid data and which part of the data stored in the first super memory block is invalid data faster than the memory controller 120. In some implementations of the disclosed technology, the memory controller 120 transmits the data stored in the first super memory block to the external device EXT_DEV irrespective of whether the data is valid or not, so that the operation of distinguishing valid data from invalid data can be executed faster in the external device EXT_DEV. In addition, by performing the distinguishing operation for the valid data and the invalid data in the external device, the memory controller 120 can avoid or prevent the delay in processing of a read operation or a write operation with respect to another super memory block included in the memory device 110.

In some implementations of the disclosed technology, the operation described in FIG. 5 may be executed by the control circuit 123 included in the memory controller 120.

Hereinafter, details of the operation of the memory system 100 described in FIG. 5 will be described. First, an operation in which the memory system 100 determines the first super memory block from the plurality of super memory blocks SBLK will be described.

FIG. 6 is a diagram illustrating the memory system determining a first super memory block based on an embodiment of the disclosed technology.

In FIG. 6, it is assumed that the indices of N (N is a natural number greater than or equal to 2) super memory blocks SBLK included in the memory device 110 of the memory system 100 are 1, 2, 3, ~, N−2, N−1, N. However, the indices of the N super memory blocks SBLK are not limited to the order of 1, 2, 3, ~, N−2, N−1, N, and may be determined in various ways.

In some implementations, the memory controller 120 may determine the first super memory block among the N super memory blocks SBLK. The memory controller 120 determines the first super memory block which satisfies predetermined conditions, for example, i) having a ratio VP of pages in which valid data is stored equal to or greater than a preset threshold ratio THR_VP and ii) having an erase count EC equal to or less than a preset threshold count THR_EC.

For a super memory block, the ratio VP of pages in which valid data is stored means the ratio of the number of pages in which valid data is stored to the total number of pages included in the corresponding super memory block.

For a super memory block, the erase count EC means the total number of times that the entire super memory block has been erased (in this case, all memory blocks in the super memory block is erased) or the total number of times that memory blocks included in the super memory block are erased (in this case, another memory block in the super memory block may not be erased).

In FIG. 6, it is assumed that the value of the threshold ratio THR_VP is 45 and the value of the threshold count THR_EC is 10.

In FIG. 6, among the plurality of super memory blocks SBLK, there are two super memory blocks, i.e., the super memory block having the index of 1 and the super memory block having the index of 3, which satisfies the conditions of having a ratio VP of pages in which valid data is stored of 45 or more and having an erase count EC of 10 or less. Accordingly, the memory controller 120 may determine one of the super memory block having an index of 1 and the super memory block having an index of 3 as the first super memory block.

When there are multiple super blocks which satisfy the predetermined conditions based on the ratio VP and the erase count EC (e.g. i) a ratio VP of pages in which valid data is stored is equal to or greater than a preset threshold ratio THR_VP and ii) an erase count EC is equal to or less than a preset threshold count THR_EC), the memory controller 120 may select one of those multiple super blocks such that the first super memory block is a super memory block that the last time point that data was written is oldest among the super memory blocks.

In another example, when there are multiple super blocks which satisfy the predetermined conditions based on the ratio VP and the erase count EC (e.g. i) a ratio VP of pages in which valid data is stored is equal to or greater than a preset threshold ratio THR_VP and ii) an erase count EC is equal to or less than a preset threshold count THR_EC), the memory controller 120 may select one of those multiple super blocks such that the first super memory block is a super memory block that the read count is largest among the super memory blocks.

In another example, when there are multiple super blocks which satisfy the predetermined conditions based on the ratio VP and the erase count EC (e.g. i) a ratio VP of pages in which valid data is stored is equal to or greater than a preset threshold ratio THR_VP and ii) an erase count EC is equal to or less than a preset threshold count THR_EC), the memory controller 120 may select one of those multiple super blocks such that the first super memory block is a super memory block that selected randomly among the super memory blocks.

Figure 7:
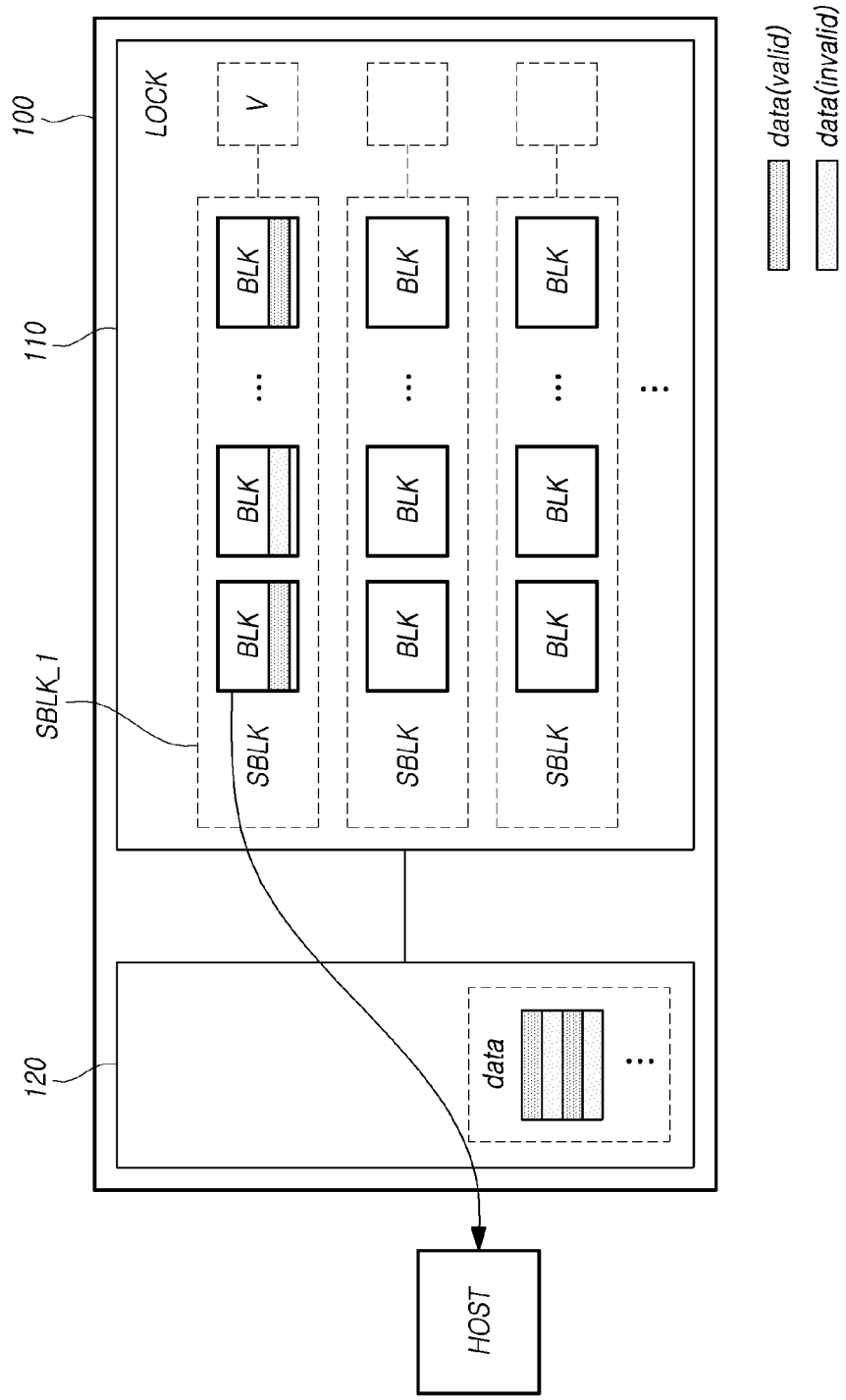
FIG. 7 is a diagram illustrating the memory system transmitting data stored in the first super memory block to an external device based on an embodiment of the disclosed technology.

FIG. 7 is a diagram illustrating the memory system transmitting data stored in the first super memory block to an external device based on an embodiment of the disclosed technology.

Referring to FIG. 7, the memory controller 120 of the memory system 100 may transmit valid data and invalid data stored in the first super memory block SBLK_1 to the external device EXT_DEV. The memory controller 120 may not internally distinguish valid data and invalid data, and transmit valid data and invalid data stored in the first super memory block SBLK_1 to the external device EXT_DEV at once. The valid data and invalid data stored in the first super memory block SBLK_1 may be transmitted to the external device EXT_DEV through the memory controller 120.

As described above, the memory controller 120 may set a lock LOCK to prevent background operations from being executed for the first super memory block SBLK_1.

Figure 8:
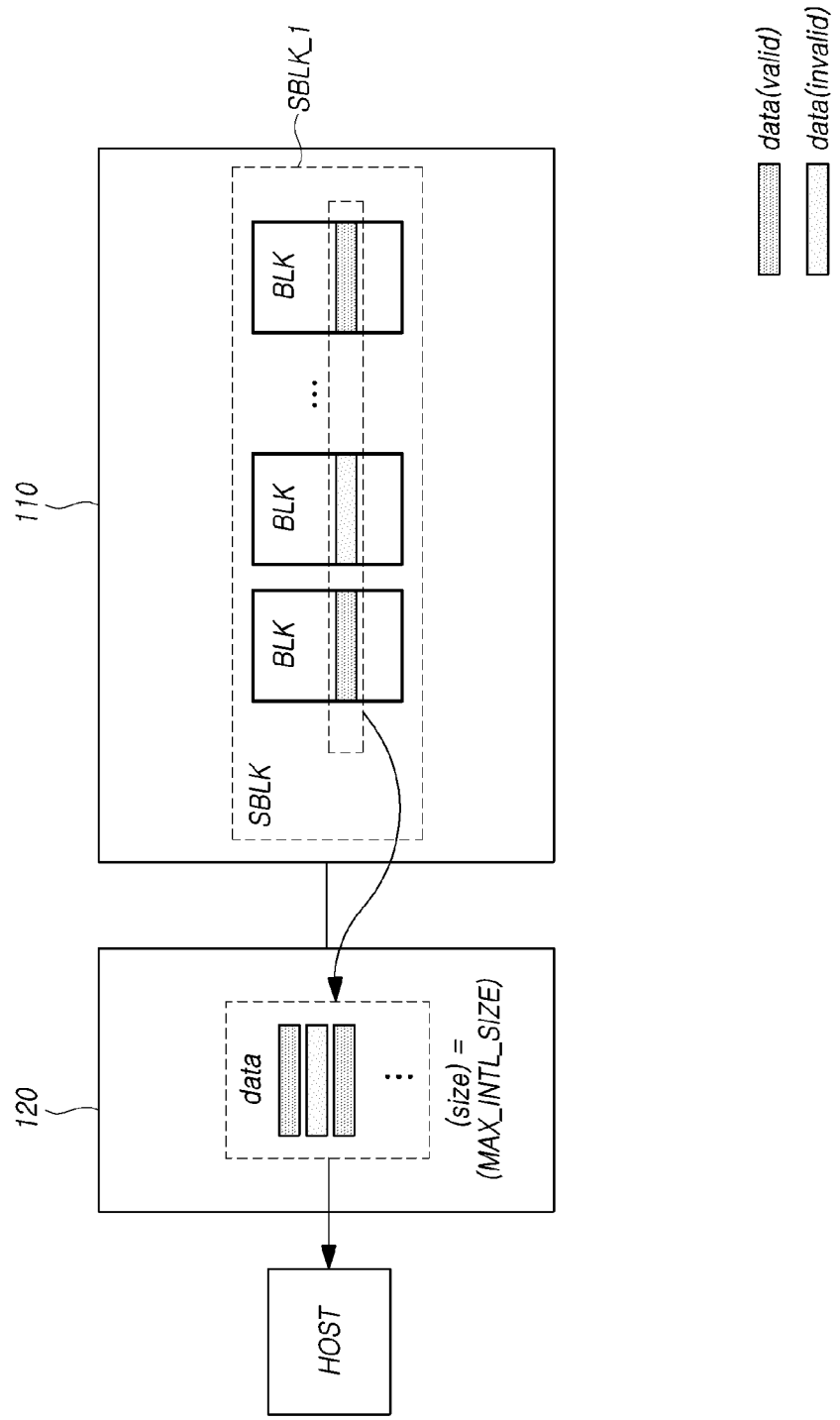
FIG. 8 is a diagram illustrating an example of unit of data that the memory system transmits to the external device based on an embodiment of the disclosed technology.

FIG. 8 is a diagram illustrating an example of unit of data that the memory system transmits to the external device based on an embodiment of the disclosed technology.

Referring to FIG. 8, the memory controller 120 of the memory system 100 may transmit the valid data and invalid data stored in the first super memory block SBLK_1 to the external device EXT_DEV in unit of maximum interleaving size MAX_INTL_SIZE.

The maximum interleaving size MAX_INTL_SIZE is a maximum size of data that can be read from the first super memory block SBLK_1 in an interleaving manner in which data distributed in one or more memory blocks BLK included in the first super memory block SBLK_1 is simultaneously read.

In this case, valid data and invalid data may be included in data transmitted to the external device EXT_DEV in units of the maximum interleaving size MAX_INTL_SIZE.

The maximum interleaving size MAX_INTL_SIZE may be determined in various ways.

For example, the maximum interleaving size MAX_INTL_SIZE may be determined based on i) the number of memory blocks BLK included in the first super memory block SBLK_1 and ii) the size of page PG included in the first super memory block SBLK_1. For example, if the number of memory blocks BLK included in the first super memory block SBLK_1 is 8 and the size of the page PG included in the first super memory block SBLK_1 is 4 KB, the maximum interleaving size MAX_INTL_SIZE may be 8*4 KB=32 KB.

In another example, the maximum interleaving size MAX_INTL_SIZE may be determined based on maximum communication bandwidth between the external device EXT_DEV and the memory system 100. For example, if the maximum communication bandwidth between the external device EXT_DEV and the memory system 100 is 128 KB per second, the maximum interleaving size MAX_INTL_SIZE may be 128 KB.

Figure 9:
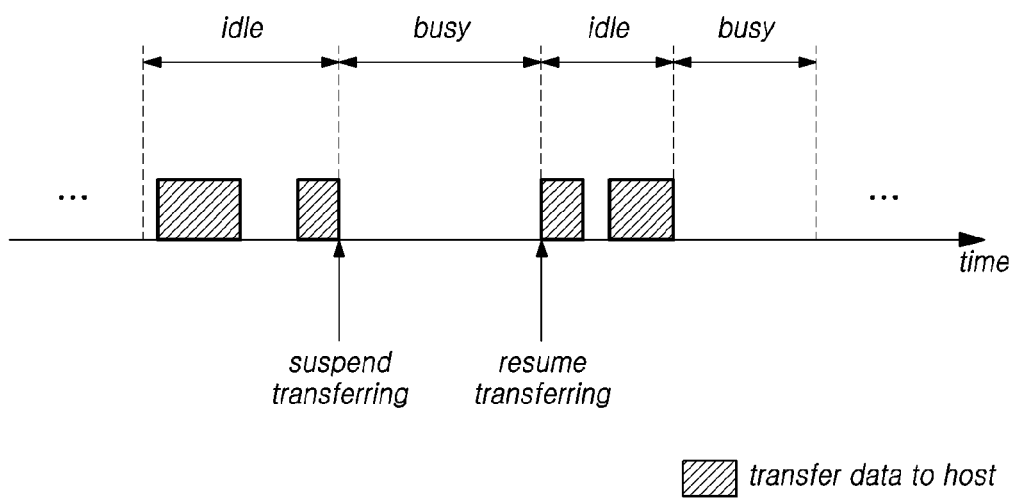
FIG. 9 is a diagram illustrating an example of time point that the memory system transmits data to the external device based on an embodiment of the disclosed technology.

FIG. 9 is a diagram illustrating an example of time point that the memory system transmits data to the external device based on an embodiment of the disclosed technology.

Referring to FIG. 9, the memory controller 120 of the memory system 100 may transmit the valid data and invalid data stored in the first super memory block SBLK_1 to the external device EXT_DEV when the memory system 100 is in idle state.

When the memory system 100 is in idle state, the memory system 100 does not process a command received from the external device EXT_DEV and does not execute a background operation. On the other hand, when the memory system 100 is in busy state, the memory system 100 processes a command received from the external device EXT_DEV or executes a background operation.

The memory controller 120 may start transmitting the valid data and invalid data stored in the first super memory block SBLK_1 to the external device EXT_DEV when the memory system 100 is in idle state.

When the memory system 100 enters the busy state from the idle state while transmitting the valid data and invalid data stored in the first super memory block SBLK_1 to the external device EXT_DEV, the memory controller 120 may suspend operation of transmitting the valid data and invalid data stored in the first super memory block SBLK_1 to the external device EXT_DEV. This is to prevent an operation of processing a command received from the external device EXT_DEV or a background operation from being delayed by the operation of transmitting the valid data and invalid data stored in the first super memory block SBLK_1 to the external device EXT_DEV.

When the memory system 100 enters the idle state again from the busy state, the memory controller 120 may resume the operation of transmitting the valid data and invalid data stored in the first super memory block SBLK_1 to the external device EXT_DEV.

The memory system 100 may transmit additional information to the external device EXT_DEV while transmitting the valid data and invalid data stored in the first super memory block SBLK_1 to the external device EXT_DEV.

Figure 10:
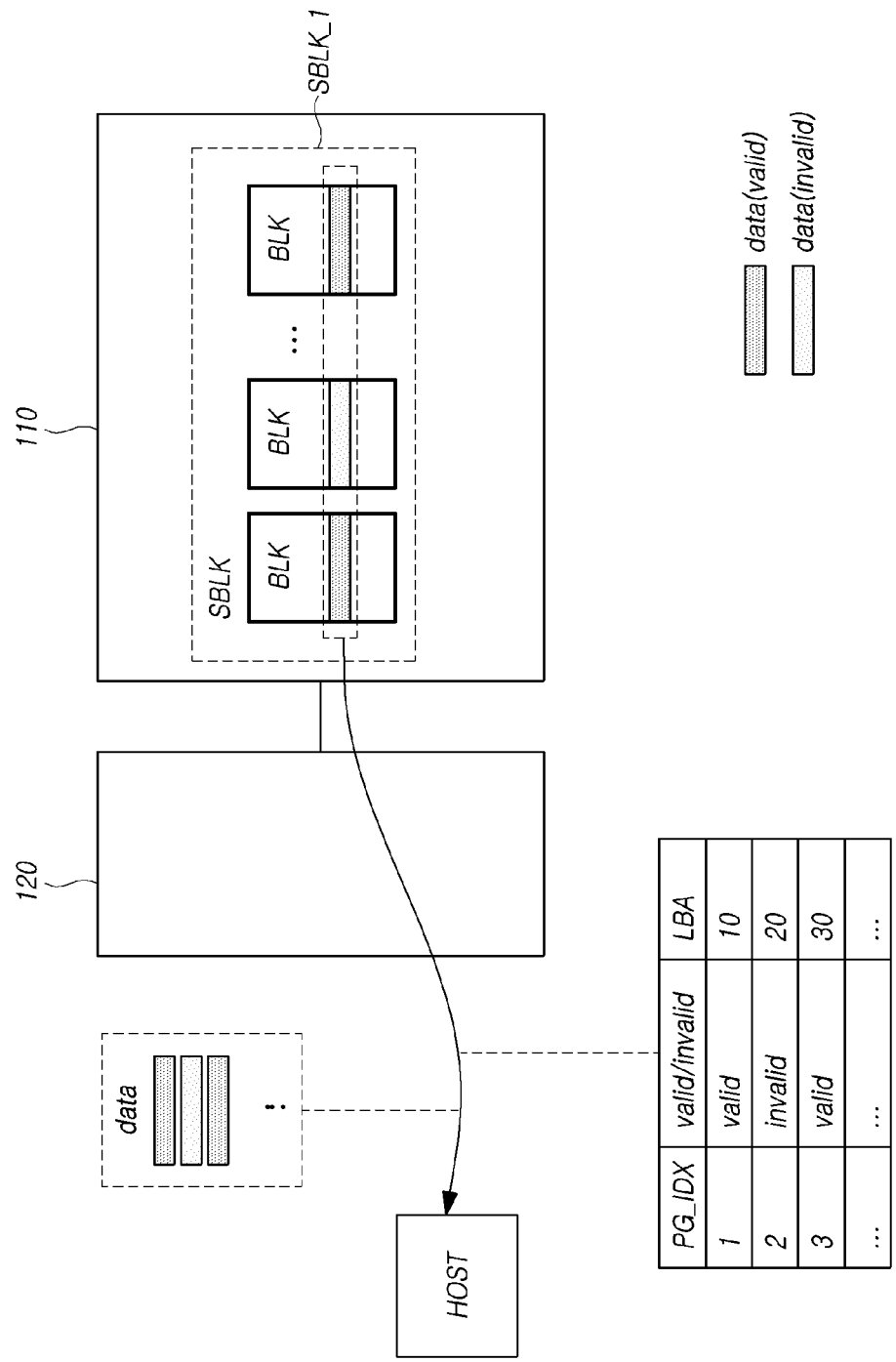
FIG. 10 is a diagram illustrating an example of additional information that the memory system transmits to the external device based on an embodiment of the disclosed technology.

FIG. 10 is a diagram illustrating an example of additional information that the memory system transmits to the external device based on an embodiment of the disclosed technology.

Referring to FIG. 10, the memory controller 120 of the memory system 100 may additionally transmit i) information indicating whether data stored in pages PG included in the first super memory block SBLK_1 is valid and ii) information of logical block address LBA corresponding to the pages PG included in the first super memory block SBLK_1 to the external device EXT_DEV while transmitting the valid data and invalid data stored in the first super memory block SBLK_1 to the external device EXT_DEV.

The reason why the memory controller 120 transmits information indicating whether data stored in pages PG included in the first super memory block SBLK_1 is valid to the external device EXT_DEV is to enable the external device EXT_DEV to determine which part of data received from the memory controller 120 is valid data and which part of data received from the memory controller 120 is invalid data.

The reason why the memory controller 120 transmits information of logical block address LBA corresponding to the pages PG included in the first super memory block SBLK_1 to the external device EXT_DEV is to indicate, when the external device EXT_DEV requests that valid data among data received from the memory controller 120 be written back to the memory device 110, that the data requested to be written by the external device EXT_DEV is data stored in the first super memory block SBLK_1.

Figure 11:
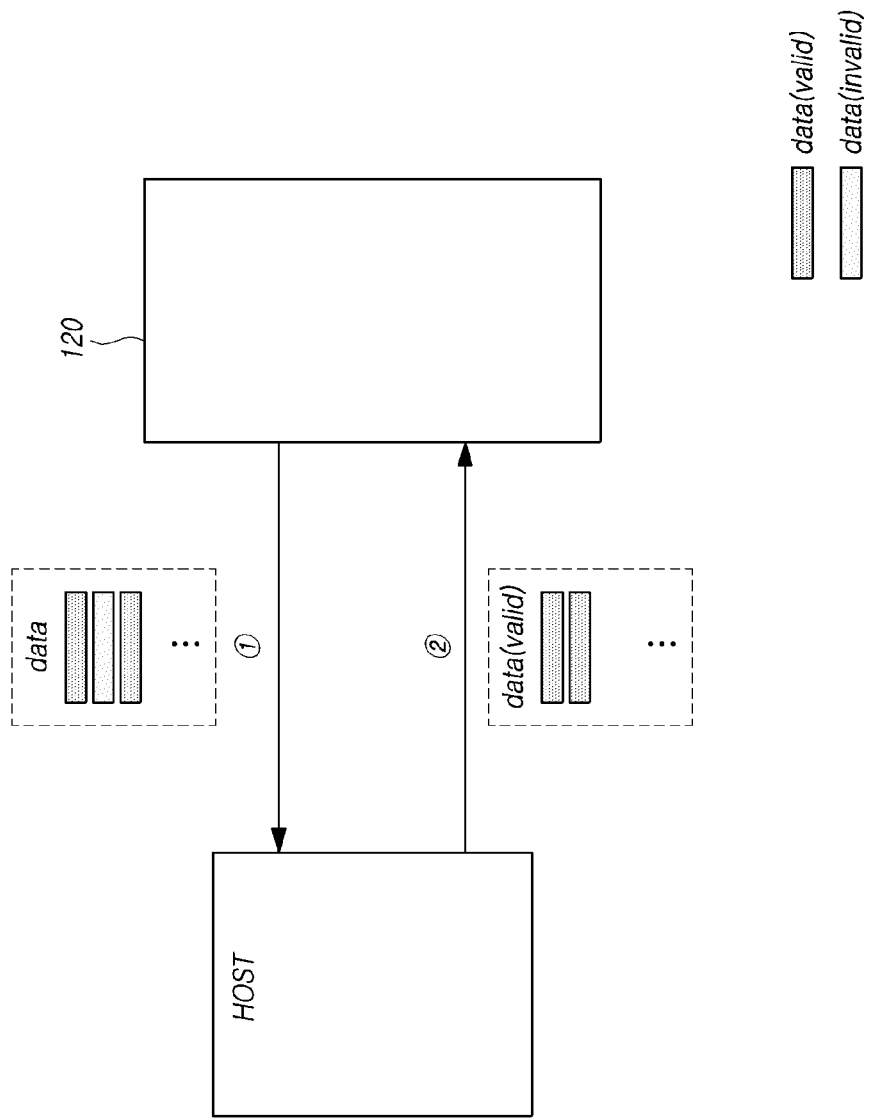
FIG. 11 is a diagram illustrating operation of the memory system receiving valid data from the external device based on an embodiment of the disclosed technology.

FIG. 11 is a diagram illustrating operation of the memory system receiving valid data from the external device based on an embodiment of the disclosed technology.

Referring to FIG. 11, the memory controller 120 of the memory system 100 may transmit the valid data and invalid data stored in the first super memory block SBLK_1 to the external device EXT_DEV (①).

Thereafter, the memory controller 120 may receive a write command, which is a command requesting to write the valid data among the valid data and invalid data transmitted to external device EXT_DEV, from the external device EXT_DEV (②). This is because, among the valid data and invalid data stored in the first super memory block SBLK_1, the invalid data is not referenced again by the external device EXT_DEV and thus does not need to be written back to the memory system 100.

Figure 12:
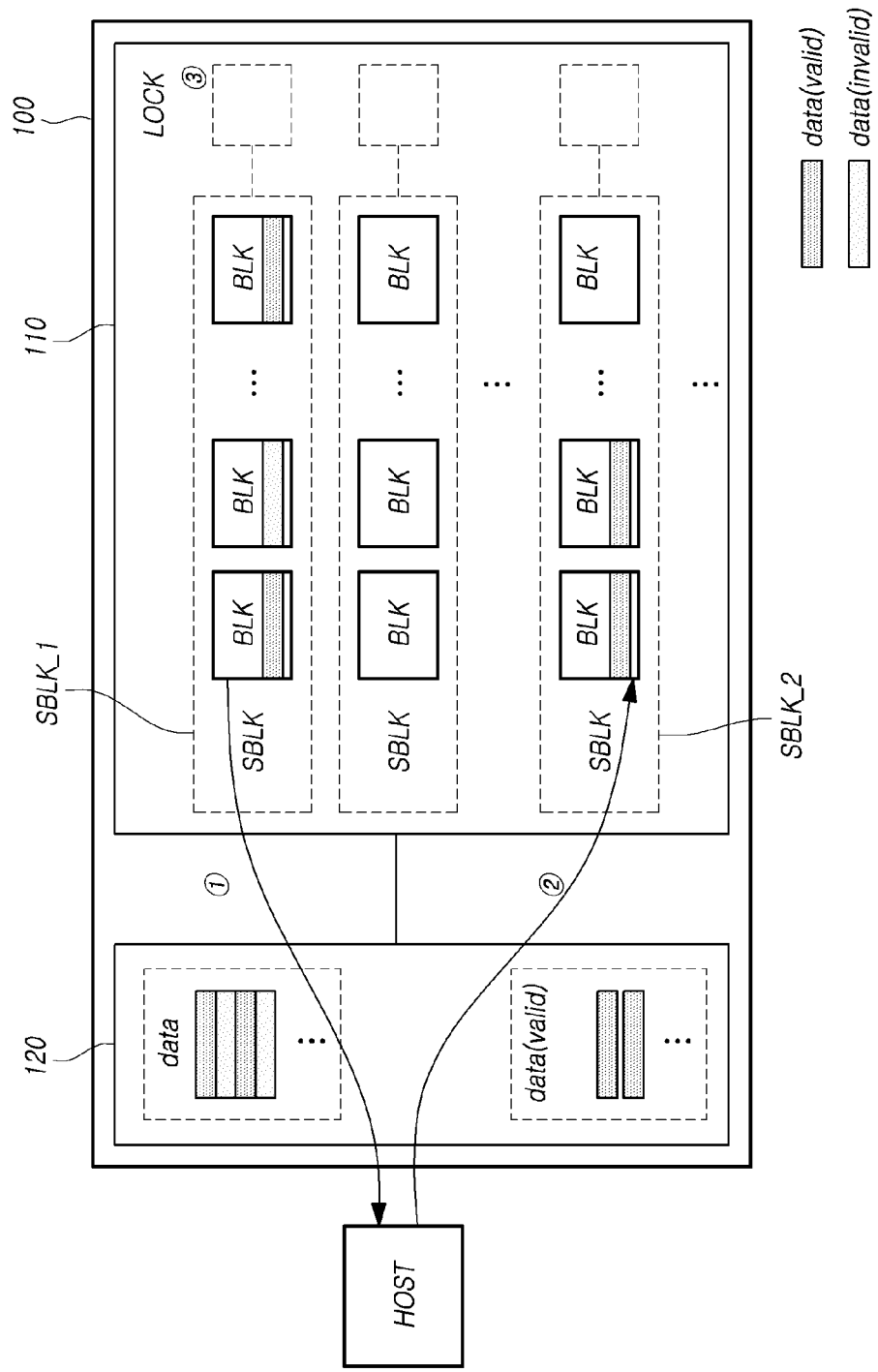
FIG. 12 is a diagram illustrating operation of the memory system storing the valid data received from the external device to a second super memory block based on an embodiment of the disclosed technology.

FIG. 12 is a diagram illustrating operation of the memory system storing the valid data received from the external device to a second super memory block based on an embodiment of the disclosed technology.

Referring to FIG. 12, the memory controller 120 of the memory system 100 may transmit the valid data and invalid data stored in the first super memory block SBLK_1 to the external device EXT_DEV (①).

Thereafter, the memory controller 120 may write the valid data, which is data that the external device EXT_DEV request to be written, to a second super memory block SBLK_2 among the plurality of super memory blocks SBLK in the memory device 110 (②). The second super memory block SBLK_2 is a different super memory block from the first super memory block SBLK_1.

Thereafter, the memory controller 120 may release the lock set in the first super memory block SBLK_1 (③).

Through this, the memory controller 120 may migrate only the valid data among the valid data and invalid data stored in the first super memory block SBLK_1 to the second super memory block SBLK_2.

Figure 13:
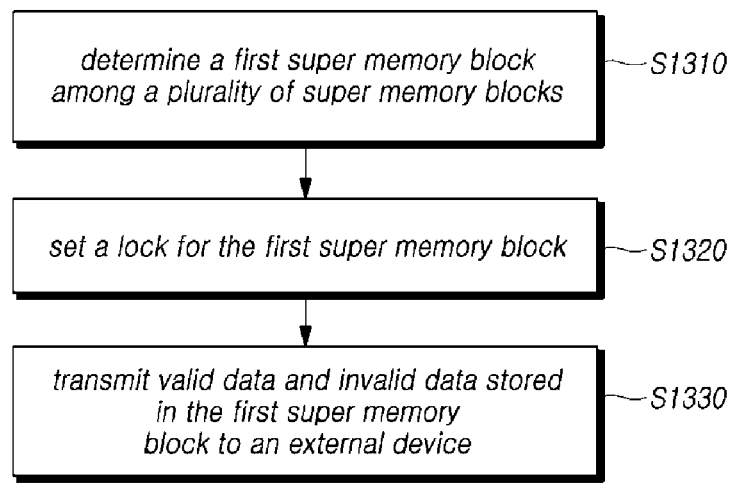
FIG. 13 is a diagram illustrating a method for operating the memory system based on an embodiment of the disclosed technology.

FIG. 13 is a diagram illustrating a method for operating the memory system based on an embodiment of the disclosed technology.

Referring to FIG. 13, the method for operating the memory system 100 may include determining a first super memory block SBLK_1 among a plurality of super memory blocks SBLK (S1310). Each of the plurality of super memory blocks SBLK may include one or more of the plurality of memory blocks BLK respectively. And each of the plurality of memory blocks BLK may include a plurality of pages PG respectively.

For example, the determining a first super memory block SBLK_1 among a plurality of super memory blocks SBLK (S1310) may determine the first super memory block SBLK_1 among the plurality of super memory blocks SBLK in which i) a ratio of pages in which valid data is stored is equal to or greater than a preset threshold ratio and ii) an erase count is equal to or less than a preset threshold count.

And the method for operating the memory system 100 may include setting a lock to prevent background operations from being executed for the first super memory block SBLK_1 (S1320).

And the method for operating the memory system 100 may include transmitting valid data and invalid data stored in the first super memory block SBLK_1 to an external device EXT_DEV (S1330).

The transmitting valid data and invalid data stored in the first super memory block SBLK_1 to the external device EXT_DEV (S1330) may transmit the valid data and invalid data stored in the first super memory block SBLK_1 to the external device EXT_DEV in unit of maximum interleaving size MAX_INTL_SIZE. The maximum interleaving size MAX_INTL_SIZE is a maximum size of data that can be read from the first super memory block SBLK_1 in an interleaving manner. In this case, the maximum interleaving size may be determined based on i) the number of memory blocks BLK included in the first super memory block SBLK_1 and ii) the size of page PG included in the first super memory block SBLK_1.

The transmitting valid data and invalid data stored in the first super memory block SBLK_1 to the external device EXT_DEV (S1330) may transmit the valid data and invalid data stored in the first super memory block SBLK_1 to the external device EXT_DEV when the memory system 100 is in idle state.

The method for operating the memory system 100 may further include transmitting i) information indicating whether data stored in pages PG included in the first super memory block SBLK_1 is valid and ii) information of logical block address LBA corresponding to the pages PG included in the first super memory block SBLK_1 to the external device EXT_DEV additionally.

The method for operating the memory system 100 may further include receiving, after transmitting the valid data and invalid data stored in the first super memory block SBLK_1 to the external device EXT_DEV, a write command, which is a command requesting to write the valid data, from the external device EXT_DEV.

And the method for operating the memory system 100 may further include writing the valid data requested by the write command to a second super memory block SBLK_2 among the plurality of super memory blocks SBLK.

Figure 14:
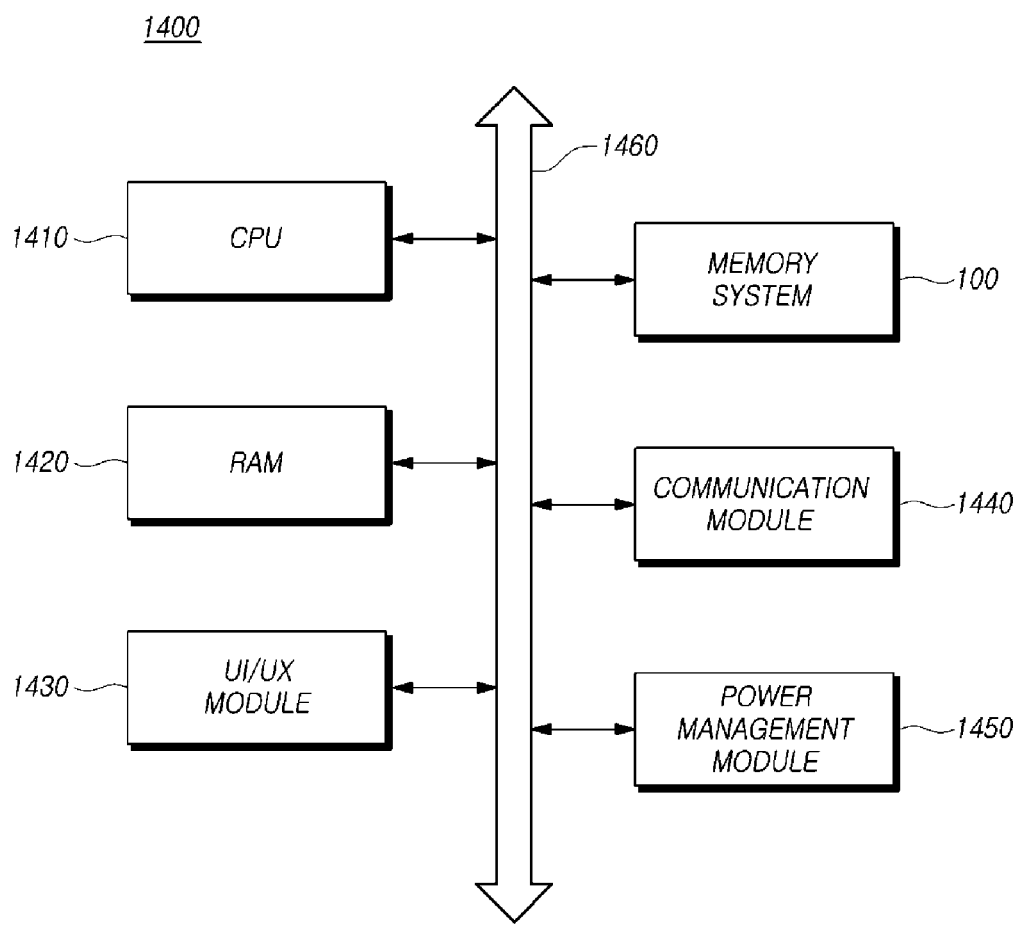
FIG. 14 is a diagram illustrating the configuration of a computing system based on some embodiments of the disclosed technology.

FIG. 14 is a diagram illustrating the configuration of a computing system 1400 based on an embodiment of the disclosed technology.

Referring to FIG. 14, the computing system 1400 based on an embodiment of the disclosed technology may include: a memory system 100 electrically connected to a system bus 1460; a CPU 1410 configured to control the overall operation of the computing system 1400; a RAM 1420 configured to store data and information related to operations of the computing system 1400; a user interface/user experience (UI/UX) module 1430 configured to provide the user with a user environment; a communication module 1440 configured to communicate with an external device as a wired and/or wireless type; and a power management module 1450 configured to manage power used by the computing system 1400.

The computing system 1400 may be a personal computer (PC) or may include a mobile terminal such as a smartphone, a tablet or various electronic devices.

The computing system 1400 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized.

Although various embodiments of the disclosed technology have been described with particular specifics and varying details for illustrative purposes, various modifications, additions and substitutions in the disclosed embodiments and other embodiments may be made based on what is disclosed or illustrated in the present disclosure.

What is claimed is:

1. A memory system, comprising:
   a memory device including a plurality of memory blocks, wherein each of the plurality of memory blocks include a plurality of pages; and
   a memory controller in communication with the memory device and configured to:
   determine a first super memory block among a plurality of super memory blocks, wherein each of the plurality of super memory blocks includes one or more of the plurality of memory blocks,
   set a lock to prevent a background operation from being executed for the first super memory block, and
   transmit data stored in the first super memory block to an external device,
   wherein the background operation for the first super memory block is not executed until the lock is released, and
   wherein the memory controller is configured to determine the first super memory block among the plurality of super memory blocks to satisfy predetermined conditions that include i) a ratio of pages in which valid data is stored is equal to or greater than a preset threshold ratio and ii) an erase count is equal to or less than a preset threshold count.

2. The memory system according to claim 1, wherein the memory controller is configured to transmit the data stored in the first super memory block to the external device in unit of a maximum interleaving size corresponding to a maximum size of data readable from the first super memory block in an interleaving manner.

3. The memory system according to claim 2, wherein the maximum interleaving size is determined based on i) the number of memory blocks included in the first super memory block and ii) the size of page included in the first super memory block.

4. The memory system according to claim 1, wherein the memory controller is configured to transmit the data stored in the first super memory block to the external device when the memory system is in idle state.

5. The memory system according to claim 1, wherein the memory controller is configured to transmit i) information indicating whether data stored in pages included in the first super memory block is valid and ii) information of logical block address corresponding to the pages included in the first super memory block to the external device additionally.

6. The memory system according to claim 1, wherein, after transmitting the data stored in the first super memory block to the external device, the memory controller is configured to receive, from the external device, a write command requesting to write valid data, and write the valid data requested by the write command to a second super memory block among the plurality of super memory blocks.

7. The memory system according to claim 1, wherein the data stored in the first super memory block includes both valid data and invalid data.

8. A method for operating a memory system, comprising:
determining a first super memory block among a plurality of super memory blocks, wherein each of the plurality of super memory blocks includes one or more of a plurality of memory blocks including a plurality of pages,
setting a lock to prevent a background operation from being executed for the first super memory block, and
transmitting data stored in the first super memory block to an external device,
wherein the background operation for the first super memory block is not executed until the lock is released, and
wherein the determining of the first super memory block determines the first super memory block among the plurality of super memory blocks to satisfy predetermined conditions that include i) a ratio of pages in which valid data is stored is equal to or greater than a preset threshold ratio and ii) an erase count is equal to or less than a preset threshold count.

9. The method according to claim 8, wherein the transmitting of the data to the external device transmit the data stored in the first super memory block to the external device in unit of maximum interleaving size corresponding to a maximum size of data readable from the first super memory block in an interleaving manner.

10. The method according to claim 9, wherein the maximum interleaving size is determined based on i) the number of memory blocks included in the first super memory block and ii) the size of page included in the first super memory block.

11. The method according to claim 8, wherein the transmitting of the data to the external device transmit the data stored in the first super memory block to the external device when the memory system is in idle state.

12. The method according to claim 8, further comprising transmitting i) information indicating whether data stored in pages included in the first super memory block is valid and ii) information of logical block address corresponding to the pages included in the first super memory block to the external device additionally.

13. The method according to claim 8, further comprising, after the transmitting of the data stored in the first super memory block to the external device,
receiving, from the external device, a write command requesting to write valid data; and
writing the valid data requested by the write command to a second super memory block among the plurality of super memory blocks.

14. The method according to claim 8, wherein the data stored in the first super memory block includes both valid data and invalid data.

15. A memory controller, comprising:
an external interface for communicating with an external storage device including a plurality of memory blocks, wherein each of the plurality of memory blocks include a plurality of pages; and
a control circuit in communication with the external interface and configured to:
determine a first super memory block among a plurality of super memory blocks, wherein each of the plurality of super memory blocks includes one or more of the plurality of memory blocks,
set a lock to prevent a background operation from being executed for the first super memory block, and
transmit data stored in the first super memory block to an external device,
wherein the background operation for the first super memory block is not executed until the lock is released, and
wherein the control circuit is configured to determine the first super memory block among the plurality of super memory blocks to satisfy predetermined conditions that include i) a ratio of pages in which valid data is stored is equal to or greater than a preset threshold ratio and ii) an erase count is equal to or less than a preset threshold count.

16. The memory controller according to claim 15, wherein the data stored in the first super memory block includes both valid data and invalid data.

* * * * *